United States Patent [19]

Zanghelli

[11] Patent Number: 4,742,962
[45] Date of Patent: May 10, 1988

[54] DEVICE FOR SUSPENSION OF A DISTRIBUTOR BAR FOR SPREADING PLANT-PROTECTIVE LIQUIDS

[75] Inventor: Patrick Zanghelli, Belleville sur-Saone, France

[73] Assignee: Berthoud S.A., Belleville sur-Saone, France

[21] Appl. No.: 58,801

[22] Filed: Jun. 5, 1987

[30] Foreign Application Priority Data

Jun. 13, 1986 [FR] France ................. 86 08977

[51] Int. Cl.⁴ ............................. B05B 1/20
[52] U.S. Cl. ..................... 239/167; 267/74; 267/248; 267/251
[58] Field of Search ............... 239/166–168, 239/172; 267/73, 74, 248, 251, 254; 56/6, 7, 208, DIG. 10; 280/104; 248/280.1

[56] References Cited

U.S. PATENT DOCUMENTS 3,716,212 2/1973 Fox ....................... 239/167

FOREIGN PATENT DOCUMENTS 609334 9/1948 United Kingdom ........... 239/167
1233847 5/1986 U.S.S.R. ..................... 239/167

*Primary Examiner*—Andres Kashnikow
*Assistant Examiner*—Karen B. Merritt
*Attorney, Agent, or Firm*—Dowell & Dowell

[57] ABSTRACT

This invention relates to a device for suspension of a distributor bar for spreading plant-protective liquids, wherein it comprises two symmetrical elements each composed of—a connecting rod pivoting with respect to the frame;—a bent rocking lever of which the apex is mounted to pivot with respect to the distributor bar, while the end of its arm oriented towards the center is articulated on the second end of the connecting rod of which the first is articulated on a fork joint of the crosspiece of the carriage mounted on the frame;—and a draw spring whose ends are hooked respectively to a lug of the connecting rod and to the free end of the arm of the rocking lever.

5 Claims, 3 Drawing Sheets

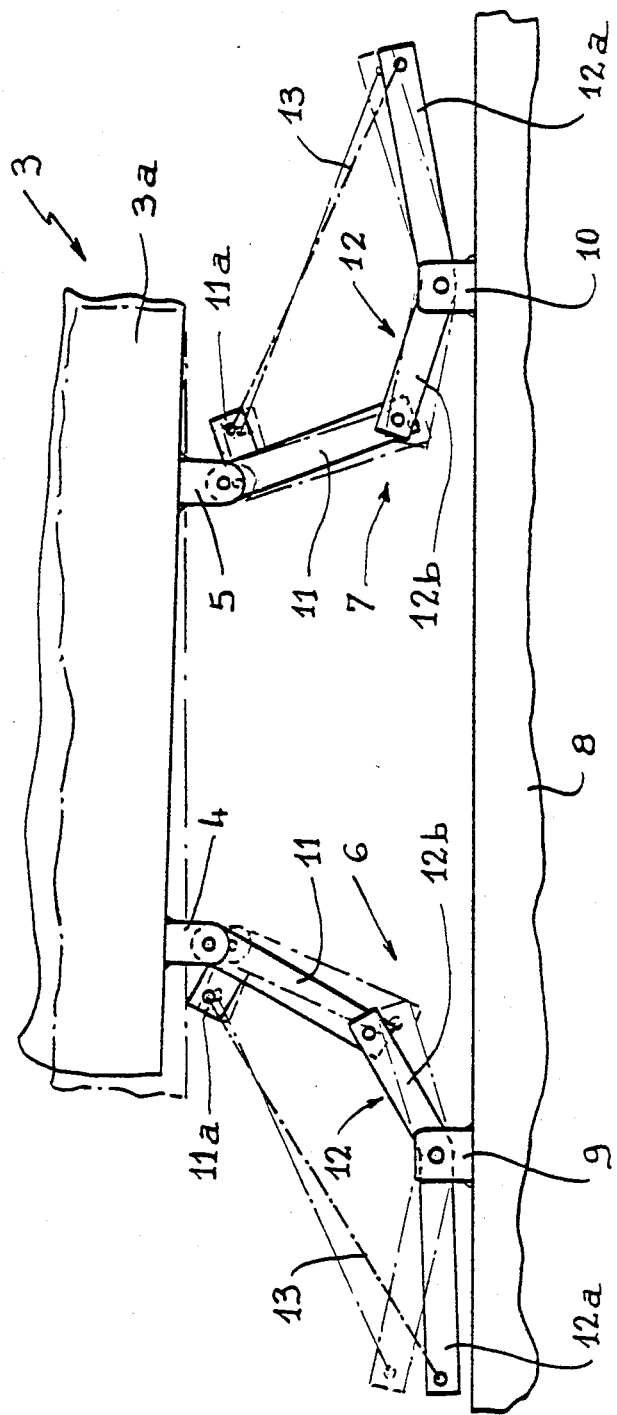

DEVICE FOR SUSPENSION OF A DISTRIBUTOR BAR FOR SPREADING PLANT-PROTECTIVE LIQUIDS

The present invention relates to a device for suspension of a distributor bar for spreading plant-protective liquids.

U.S. Pat. No. 1 583 619 describes a device for spreading plant-protective liquids, comprising a distributor bar supported by the chassis of a carrier machine by means of two sets of two connecting rods, the connecting rods of each set being disposed vertically one after the other. These double rods, parallel to one another between their points of articulation on the chassis and on the distributor bar respectively, constitute a deformable quadrilateral allowing the transverse displacements of this bar, with the result that the latter remains parallel to the axis of the wheels, so that they remain substantially parallel to the ground during the displacements of the carrier machine.

However, although this system enables the oscillations of the distributor bar to be absorbed and its parallelism with the ground to be ensured, it is not entirely satisfactory, inter alia when the carrier machine is jolted, for example when one of the wheels of the machine drops into a hole, such bumps being communicated to the distributor bar.

With such a suspension, absorption of the angular shocks communicated to the distributor bar is thus very long, this resulting in imperfect spreading. Appreciable quantities of liquid are thus lost and the cost price of the treatment is increased accordingly.

A document published by the Société Française des Mécaniciens also discloses a system for suspension of the body of high-speed electric locomotives with respect to the bogies, comprising two divergent connecting rods which enable the oscillations of the body with respect to said bogies to be absorbed.

However, the application of such a system to a distributor bar for spraying plant-protective liquids mounted on a carrier machine is not satisfactory, as the oscillations of said bar are not absorbed rapidly.

It is an object of the improvements forming the subject matter of the present invention to overcome the drawbacks set forth hereinabove and to provide a device for suspension of a spray bar which, in addition to its ability to maintain the distributor bar parallel to the ground when the carrier machine moves over sloping ground, enables the movements of the bar which are communicated thereto by a sudden oscillation of the carrier machine, to be very rapidly absorbed.

The invention will be more readily understood on reading the following description with reference to the accompanying drawings, in which:

FIG. 3 shows how an angular shock communicated to the spray bar by the carrier machine is absorbed.

Figure 1:
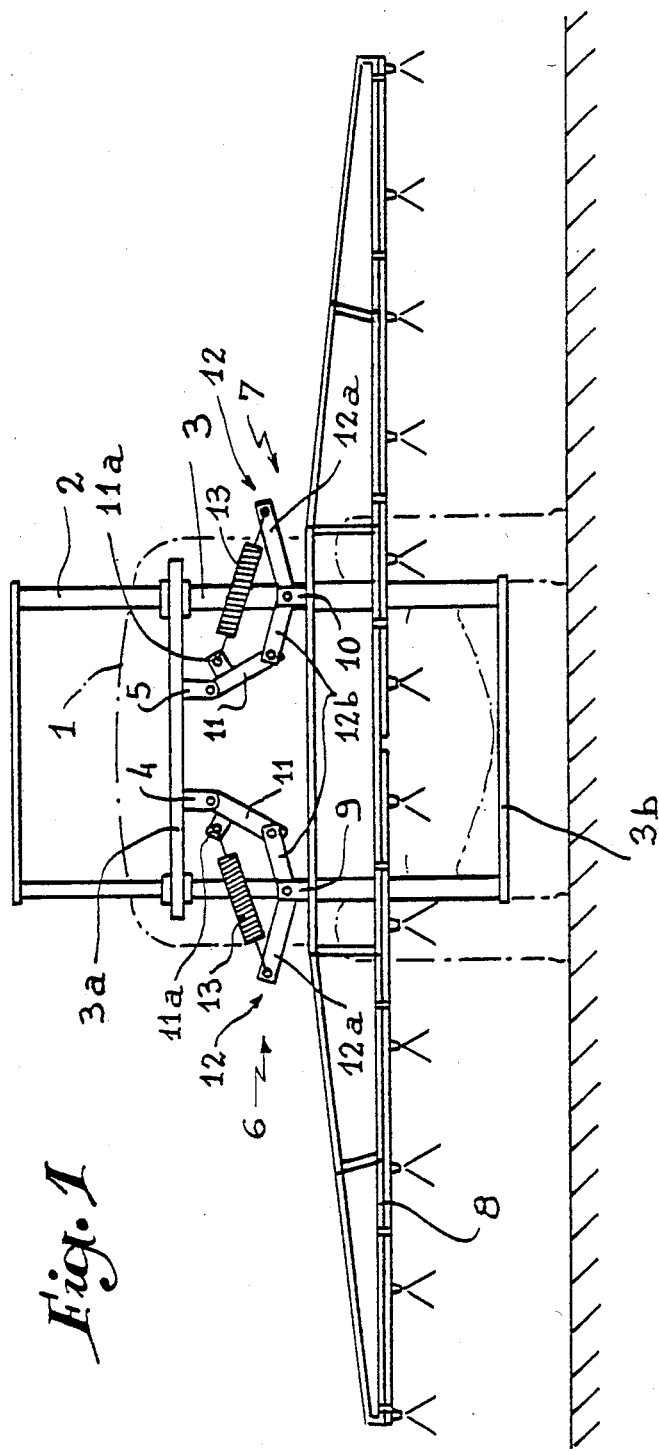
FIG. 1 is a view from the rear of a carrier machine bearing a spray bar comprising a suspension device according to the invention.

Referring now to the drawings, FIG. 1 illustrates a carrier machine 1 provided in its rear part with a fixed frame 2 of which the vertical uprights constitute slideways for a carriage 3 essentially comprising two horizontal crosspieces 3a, 3b. Symmetrically with respect to the centre of the upper crosspiece 3a, this latter comprises two downwardly oriented fork joints 4, 5 which serve as pivot for the two symmetrical elements 6, 7 which constitute the device according to the invention. The latter is intended to suspend a spray bar 8 which bears on the upper element of its beam two tabs 9, 10 each connected to the fork joints 4, 5 respectively of the crosspiece 3a by one of the above-mentioned elements.

Each of the latter firstly comprises a connecting rod 11 of which one of the ends is articulated on the corresponding fork joint 4, 5. Each element 6, 7 further comprises a rocking lever 12 comprising two arms 12a, 12b determining therebetween an obtuse angle and of which the apex is mounted to pivot with respect to the tab 9, 10, respectively of the distributor bar 8. The arm 12b which is oriented inwardly is shorter than the other, 12a, and its end is mounted to pivot with respect to the end of the connecting rod 11 opposite the one which is articulated on the fork joint 4, 5. It is observed that each connecting rod 11 is provided, in the vicinity of its end articulated on the crosspiece 3a of the carriage 3, with a lug 11a outwardly oriented in the assembly illustrated and to which is attached one of the ends of a traction spring 13 of which the other end is hooked to the free end of the arm 12a of the rocking lever 12 which is oriented outwardly.

To give a non-limiting example, the centre distance of the connecting rod 11 is set, in a preferred embodiment, at a value of 154 mm, whilst the length, still between the pivot axis, of the arms 12a, 12b of the rocking lever 12 is 117 and 185 mm, respectively.

Figure 2:
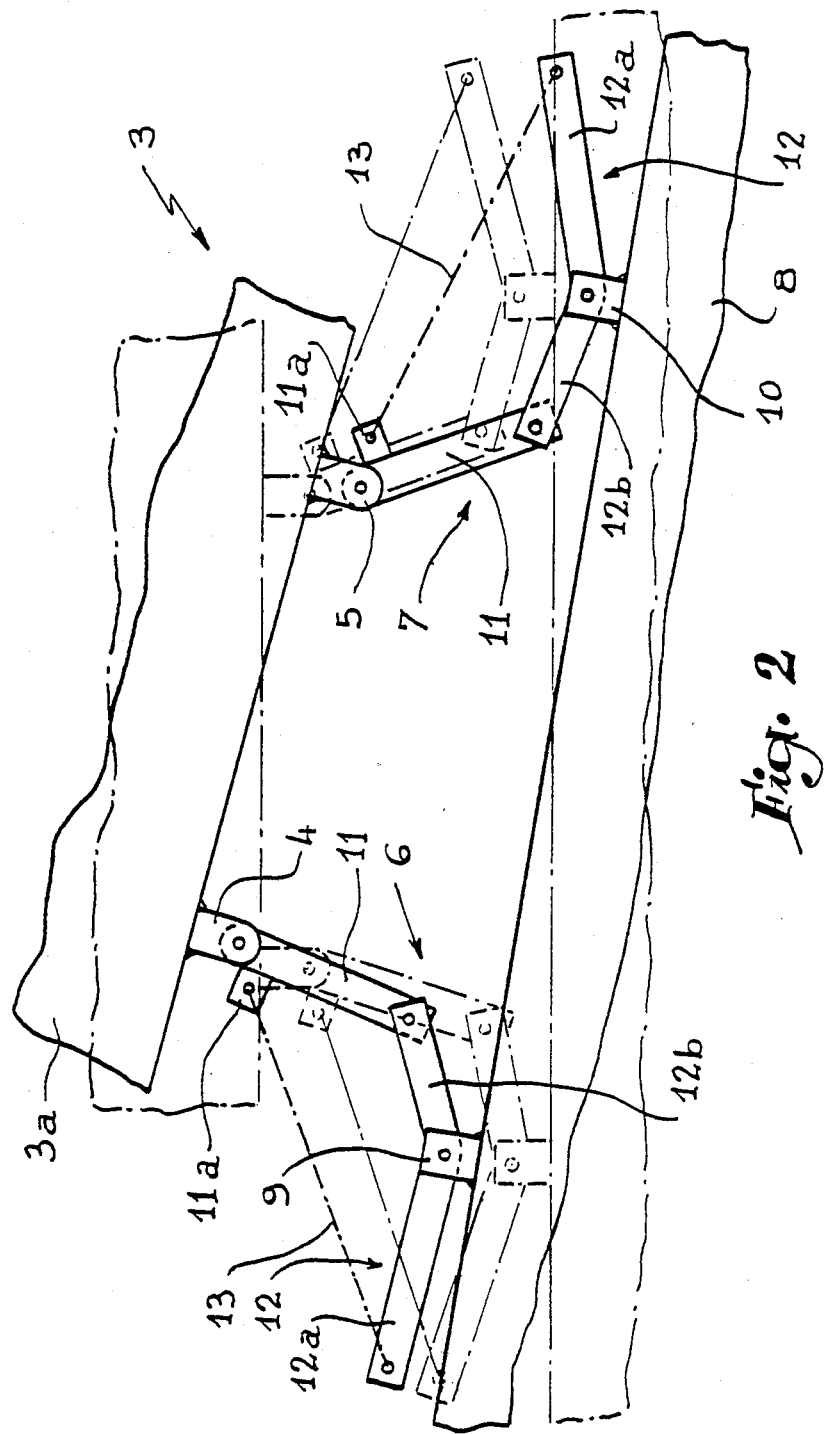
FIG. 2 illustrates the manner in which the suspension device functions during displacement of the carrier machine over sloping ground.

FIG. 2 illustrates the position taken by the distributor bar 8 when the carrier machine 1 rolls over sloping ground, i.e. when its axle is oblique with respect to the horizontal. Under these conditions, the crosspiece 3a of the carriage is parallel to the ground in the position illustrated in solid lines in FIG. 2, whilst the distributor bar and the suspension device have been illustrated in discontinuous lines when the carrier machine is on horizontal ground. It will be observed that the bar inclines like crosspiece 3a, but by a smaller angle due to the divergence of the two elements constituting the suspension according to the invention. In other words, in that case, the springs 13, shown by a simple line, virtually do not intervene and the suspension is of the type described in the bulletin of the Société Française des Mécaniciens mentioned hereinbefore. It goes without saying that such operation is also found in the case of the carrier machine rolling with its two lateral wheels disposed on the same side in the bottom of a rut, whilst the other two wheels roll over ground higher than the bottom of this rut.

If one of the wheels of the carrier machine 1 encounters a projecting obstacle or falls into a hole, this sudden movement is transmitted to the frame 2 and to the crosspiece 3a. However, due to the presence of the suspension device according to the invention, dampening of the distributor bar is extremely rapid, due to:

the inertia of the bar and of the springs as the distance between the fork joint 4 and the tab 9 increases (in the example illustrated in FIG. 3), the corresponding spring 13 extending, whilst the distance between fork joint 5 and tab 10 decreases, such variation being allowed by a reduction in length of said spring 13. Of course, this change in length of the spring is possible since, at rest, the springs are already under tension, i.e. their turns are not contiguous. If the effort is not sufficient to deform the length of the springs, it is as if the distributor bar were suspended from the crosspiece 3a by divergent connecting rods, as illustrated in the bulletin of the Société Française des Mécaniciens. In that case, the bar does not oscillate through an angle as large as the frame 2 and it moves slightly laterally.

A system for suspension of a distributor bar for spreading plant-protective liquids has thus been produced which may present a very long length (of the order of 35 to 50 meters) and whose oscillations due to sudden changes in orientation of the carrier machine are very quickly absorbed, whilst the distributor bar remains virtually parallel to the ground in all positions of the machine.

It must, moreover, be understood that the foregoing description has been given only by way of example and that it in no way limits the domain of the invention which would not be exceeded by replacing the details of execution described by any other equivalents. In particular, the lug 11a of each connecting rod 11 may be eliminated, the corresponding end of each spring 13 being directly fastened to said connecting rod.

What is claimed is:

1. In a device for suspension of a distributor bar for spreading plant-protective liquids with respect to a frame supported by a carrier machine and constituted by two assemblies disposed symmetrically with respect to the centre of the distributor bar, each assembly comprises:
    a connecting rod pivoting with respect to the frame by one of its ends;
    a bent rocking lever of which the apex is mounted to pivot with respect to the distributor bar, whilst the end of its arm oriented towards the centre is articulated on the second end of the connecting rod;
    and a draw spring of which the ends are fastened respectively to the connecting rod and to the end of the second arm of the rocking lever turned outwardly.

2. The device of claim 1, wherein each connecting rod comprises a lug extending outwardly and placed near its end articulated on the crosspiece of the carriage.

3. The device of claim 2, wherein the arms of each rocking lever are dissymetrical, the one connected to the connecting rod being shorter than the other.

4. The device of claim 3, wherein the longer arm of the rocking lever is located outside with respect to its pivot on the distributor bar.

5. The device of claim 3, wherein the length of the connecting rod is intermediate between those of the two arms of the rocking lever.

* * * * *